United States Patent

Morishima et al.

Patent Number: 5,515,122
Date of Patent: May 7, 1996

[54] IMAGE DISPLAYING APPARATUS

[75] Inventors: Hideki Morishima, Tokyo; Susumu Matsumura, Kawaguchi; Naosato Taniguchi, Machida; Yoko Yoshinaga, Kawasaki; Shin Kobayashi, Atsugi; Toshiyuki Sudo, Kawasaki; Tadashi Kaneko, Isehara; Norihiro Nanba, Kawasaki; Takeshi Akiyama, Yokohama, all of Japan

[73] Assignee: Canon Kabushiki Kaisha, Tokyo, Japan

[21] Appl. No.: 267,980

[22] Filed: Jun. 29, 1994

[30] Foreign Application Priority Data

Jun. 30, 1993 [JP] Japan .................. 5-187480
May 31, 1994 [JP] Japan .................. 6-118546

[51] Int. Cl.$^6$ .................. G02B 27/14
[52] U.S. Cl. .................. 353/98; 353/28; 359/631
[58] Field of Search .................. 353/7, 10, 28, 353/98, 99; 359/13, 14, 462, 471, 472, 473, 475, 478, 479, 629, 630, 631, 633

[56] References Cited

U.S. PATENT DOCUMENTS

| | | | |
|---|---|---|---|
| 3,904,289 | 9/1975 | Yager | 353/122 |
| 4,383,740 | 5/1983 | Bordovski | 359/631 |
| 4,600,271 | 7/1986 | Boyer et al. | |
| 4,859,030 | 8/1989 | Rotier | 359/631 |
| 5,124,821 | 6/1992 | Autier et al. | 359/630 |
| 5,130,794 | 7/1992 | Ritchey. | |
| 5,257,094 | 10/1993 | LaRussa | 359/13 |
| 5,278,532 | 1/1994 | Hegg | 359/13 |
| 5,299,063 | 3/1994 | Fritz et al. | 359/631 |

FOREIGN PATENT DOCUMENTS

| | | |
|---|---|---|
| 284389 | 9/1988 | European Pat. Off. . |
| 526067 | 2/1993 | European Pat. Off. . |
| 582229 | 2/1994 | European Pat. Off. . |
| 5341704 | 6/1992 | Japan . |
| 9104508 | 4/1991 | WIPO . |

OTHER PUBLICATIONS

European Search Report.

*Primary Examiner*—William C. Dowling
*Attorney, Agent, or Firm*—Morgan & Finnegan

[57] ABSTRACT

An image displaying apparatus capable of displaying to an observer a more stereoscopic image with enhanced presence and realism. The apparatus has a display unit which irradiates a beam and an optical system which directs a light beam from said display to a pupil of an observer, a virtual image surface formed by said optical system being a curved surface.

15 Claims, 11 Drawing Sheets

1

IMAGE DISPLAYING APPARATUS

BACKGROUND OF THE INVENTION

1. Field of the Invention

The present invention relates to an image displaying apparatus and, in particular, to an image displaying apparatus, which projects a light beam having information on an image generated by an image generator onto the eyes of an observer through an optical system and displays the image as a virtual image for an observer.

2. Related Background Art

Conventionally, a large-screen image, which produces presence is displayed by using a large CRT display system, a projection TV or the like.

These systems, however, have problems of restricted conditions for use. For example, they require larger space and the images are difficult to see unless surrounding thereof is dark. For this reason, there has recently been proposed an apparatus designed to directly project a light beam from an image displayed on an image display device onto the eyes of an observer through an optical system disposed extremely close to a person's face, thereby making the observer visually recognize an equivalently larger image as a virtual image.

FIG. 1 illustrates a main portion of an image displaying apparatus proposed in Japanese Patent Application Laid-Open No. 4-34512. An image is displayed on a liquid crystal display 101 by data sent through a signal line 116. The display 101 is transmissively illuminated with a backlight light source 104. Light which has passed through the display 101 provides a light beam including the information of the displayed image.

After the light beam passes through a magnifying lens 151, it is reflected by a mirror 150 to become a light beam 109 and thereafter it reaches a pupil 107 of an observer. The observer visually recognizes the displayed image by observing the light beam 109. The power of the magnifying lens 151 is set so that an image on the liquid crystal display 101 is displayed as a virtual image at a predetermined distance, e.g., at a point, which is 5 meters in front.

In the foregoing conventional example, however, a surface whereon the virtual image is displayed is a plane; therefore, the displayed image seems flat for the observer, failing to display to produce greater presence. Moreover, when the image display of the foregoing conventional example is applied for displaying an image of a virtual reality system, the image gives the observer an impression as if the image were projected on a flat screen, failing to produce a satisfactory presence.

SUMMARY OF THE INVENTION

It is an object of the present invention to provide an image displaying apparatus capable of displaying so as to provide an observer with an image being more stereoscopic and brimming over with presence and realism.

A mode of the image displaying apparatus according to the present invention to fulfill the object comprises a display which emits light, and an optical system, which directs light beam from the display to the pupils of an observer, a virtual image surface formed being a curved surface.

A preferred mode of the image displaying apparatus is characterized by each of the image displaying apparatuses being respectively provided corresponding to a right pupil and a left pupil of the observer, and each of virtual image surfaces being formed within the same curved surface.

A preferred mode of each of virtual image surfaces is characterized by that at least one portions of them are mutually overlapped.

A preferred mode of the curved surface is characterized by being a spherical surface.

A preferred mode of the curved surface is characterized by being a cylindrical surface.

A preferred mode of the curved surface is characterized by being a paraboloid surface.

A preferred mode of the optical system is characterized by radius of curvature of the virtual image surface being substantially equivalent to the inverse number of the Petzval's sum of the optical system in a cross section having the curvature.

A preferred mode of the optical system is characterized by comprising a hologram combiner.

A preferred mode of the optical system is characterized by comprising a relay optical system and a reflecting surface having a shape which is not rotationally symmetrical with respect to the optical axis of the relay optical system and also having an optical power along a light beam, which travels from the display unit toward the pupils.

A preferred mode of the reflecting surface is characterized located at a place where lights of each field of view don't overlap or at least chief rays of every field don't overlap.

A preferred mode of the reflecting surface is characterized in that the reflecting surface is located near an intermediate image forming surface of the relay optical system.

Several characteristics and specific modes of the present invention will be hereinafter described in the embodiments.

DETAILED DESCRIPTION OF THE PREFERRED EMBODIMENTS

Figure 2:
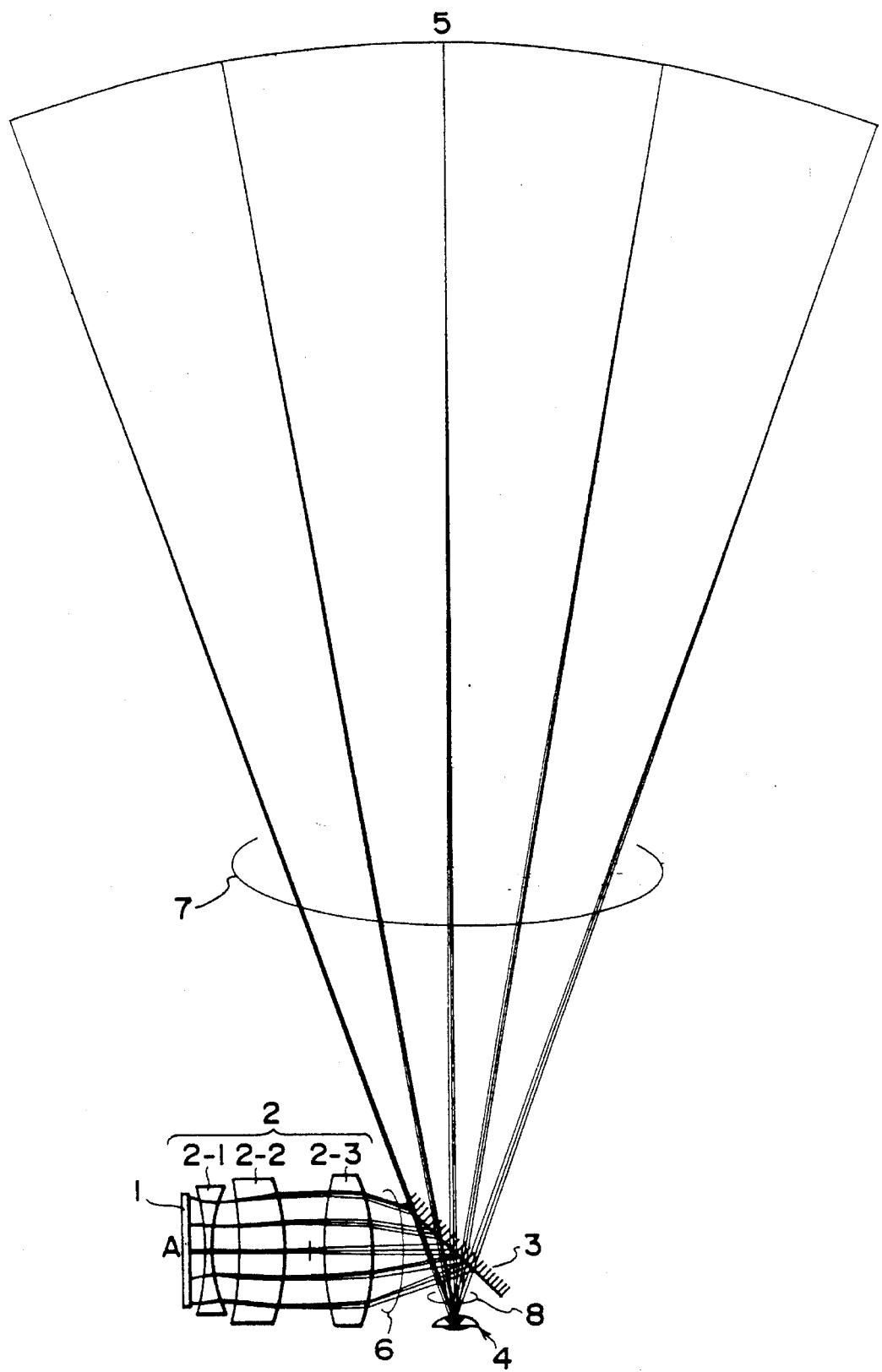
FIG. 2 shows the optical configuration of the first embodiment of the present invention.

FIG. 2 is a layout plan of an optical system, which shows the first embodiment of the present invention. In an actual apparatus, an image is projected onto both right and left eyes, configuration of the apparatus being designed so that it is laterally symmetric to a symmetric plane of an observer's face.

FIG. 2 shows the apparatus observed downward from above the head and it illustrates a portion corresponding to the left eye. A portion corresponding to the right eye is laterally symmetric to the portion of FIG. 2, but it is omitted because it would make the view complicated.

In FIG. 2, a liquid crystal display device 1, which is an image generator, (hereinafter referred to as "LCD") displays an image in accordance with an image signal sent through a signal line, which is not shown. The LCD 1 is illuminated from the left side by an illuminator, which is not shown.

Figure 1:
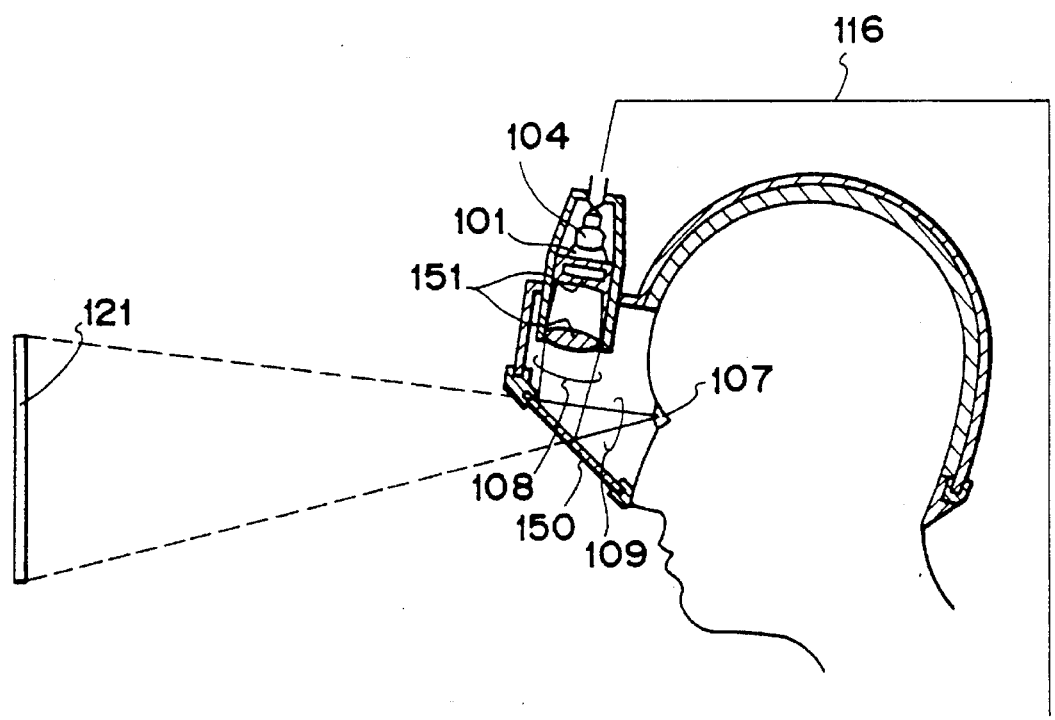
FIG. 1 shows a conventional image display apparatus.

The signal line and the illuminator, which are not shown, may be regarded as identical to those of the conventional example in FIG. 1. A light beam, which has passed through the LCD 1, is converted to a light beam having an image information to be incident on a lens system 2. The light beam which has passed through the lens system 2, undergoes an operation of image formation by the system 2 to become an outgoing light beam 6, which is reflected by a half mirror 3 and reaches a left eye 4 of the observer as a light beam 8. The lens system 2 works so that a virtual light beam 7 which extends the reflected light beam 8 in the opposite direction to the travelling direction of the actual light beam forms an image on a virtual image surface 5.

Therefore, the observer is destined to recognize the reflected light beam 8 as if it were light emitted from each of points on the virtual image surface 5. The image on the LCD 1 is enlarged in such a way and visually recognized as an image formed on the virtual image surface 5.

The present invention is characterized by the utilization of an ergonomic fact in that providing the virtual image surface 5 to be observed with a curved surface increases presence. In this embodiment, the virtual image surface 5 is a spherical surface, which has a preset distance, e.g., 1 meter from the left eye 4 defined as the radius thereof.

Setting the virtual image surface 5 in such a way enables the observer to observe the image on the LCD 1 as an enlarged form, making the observer feel as if the image were projected on a spherical screen having a 1-meter radius around the left eye 4. As a result, through the image visually recognized by the virtual image surface 5 with the 1-meter radius, the observer is able to enjoy an image, which gives the observer far more presence than if the virtual image surface were a plane.

As above-mentioned, in the actual apparatus, with respect to the symmetric surface of the observer's face, there exists the portion of the right eye corresponding to that of the left eye shown in FIG. 2. The virtual image surfaces to be formed are two spherical surfaces centering around the left eye and the right eye, the surfaces being displaced by the distance between the eyes, e.g., 60 mm. The two virtual image surfaces should originally coincide with each other in both shape and position. In other words, the two virtual image surfaces should be present within the same curved surface.

According to the numerical example of this embodiment, virtual surfaces for the right eye and the left eye, respectively, are spherical surfaces, each which is 1,000 mm away from the individual corresponding eyes and which have a 1000-mm radius. Accordingly, the displacement of 60 mm does not cause a significant trouble to an image recognition by both eyes.

Referring to the system shown in FIG. 2, means for turning the virtual image surface 5 into the spherical surface with a 1000-mm radius around the left eye 4 will now be hereinafter described. The lens system 2 is partly responsible for forming an image. The lens 2 comprises three lenses, 2-1 through 2-3.

Forming an image with a central point A on the LCD 1 will now be hereinafter described. If it is assumed that the distance from a right surface of the third lens 2-3 of the lens system 2 to a half mirror 3 is 60 mm and the distance from the half mirror 3 to a left eye 4 is 50 mm, then the left eye lies away from the right surface of 2-3, i.e., from the surface closer to the eye, by the sum of the two distances, 110 mm. The lens system 2 acts to form the image of a central point A as a virtual image at a point, which is located at 890 mm from the right surface of the lens 2-3 nearest to the eye, i.e., at a point to the left by the distance obtained by subtracting 110 mm from 1000 mm.

Further, the lens system 2 is designed so that the Petzval's sum is almost $\frac{1}{1000}$ mm$^{-1}$. By setting the lens system 2 as described above, it is possible to turn the virtual image surface 5 into a spherical surface with a 1000-mm radius, centering around the left eye 4.

As above-mentioned, in this embodiment, there exists a portion corresponding to the right eye exactly symmetric to that of the system shown in FIG. 2. For this portion, a spherical virtual image surface centering around the right eye and having a 1000-mm radius can be produced for the right eye by configuring the system exactly in the same manner as that for the left eye.

When a half mirror 3 is used as shown in FIG. 2, it is necessary to avoid crosstalk between the right and left systems. If a light beam 6 from the image for the left eye transmits through 3 to illuminate the LCD 1 for the right eye, then the light beam turns into a flare light beam and adversely affects the contrast of the image observed by the right eye. The same applies to a light beam of the image for the right eye.

For this reason, it is necessary to provide a light shielding member between the optical systems for the right and left eyes so as to prevent the light beam of the image displayed on the left side from reaching the right eye and the beam displaying the right image from reaching the left eye. If, however, a mirror is used for numeral 3, then no crosstalk will take place, and there is no need to provide the light shielding member. As another alternative, the optical systems may be configured to prevent crosstalk as shown by the convention example of FIG. 1.

In this embodiment, it is not always necessary to display the same image for the right and left eyes; it is possible to enable the observer to visually recognize a three-dimensional image by having the right and left LCDs display images, which respectively have a parallax. In this case also, the virtual image surfaces which are spherical surfaces with finite distances, surround the observer allowing a stereoscopic image to be displayed with more presence.

The first embodiment of FIG. 2 illustrates the example, wherein the virtual image surfaces are the spherical surfaces with the 1000-mm radius, centering around the right and left eyes. If, however, an image displayed is longer sideways, e.g., an HD-sized or panorama-sized image, then the virtual image surfaces should be preferably cylindrical surfaces surrounding the observer rather than the spherical surfaces. Furthermore, to enhance the capturing effect, the virtual image surfaces should not be preferably very far away from the observer.

In a case that the virtual image surfaces are close, it is desirable that virtual image surfaces for the right eye and the left eye are not mutually displaced but coincide with each other as to shape and position. In other words, they should preferably be within in the same curved surface. However they may be overlapped each other fully or partially.

Figure 3:
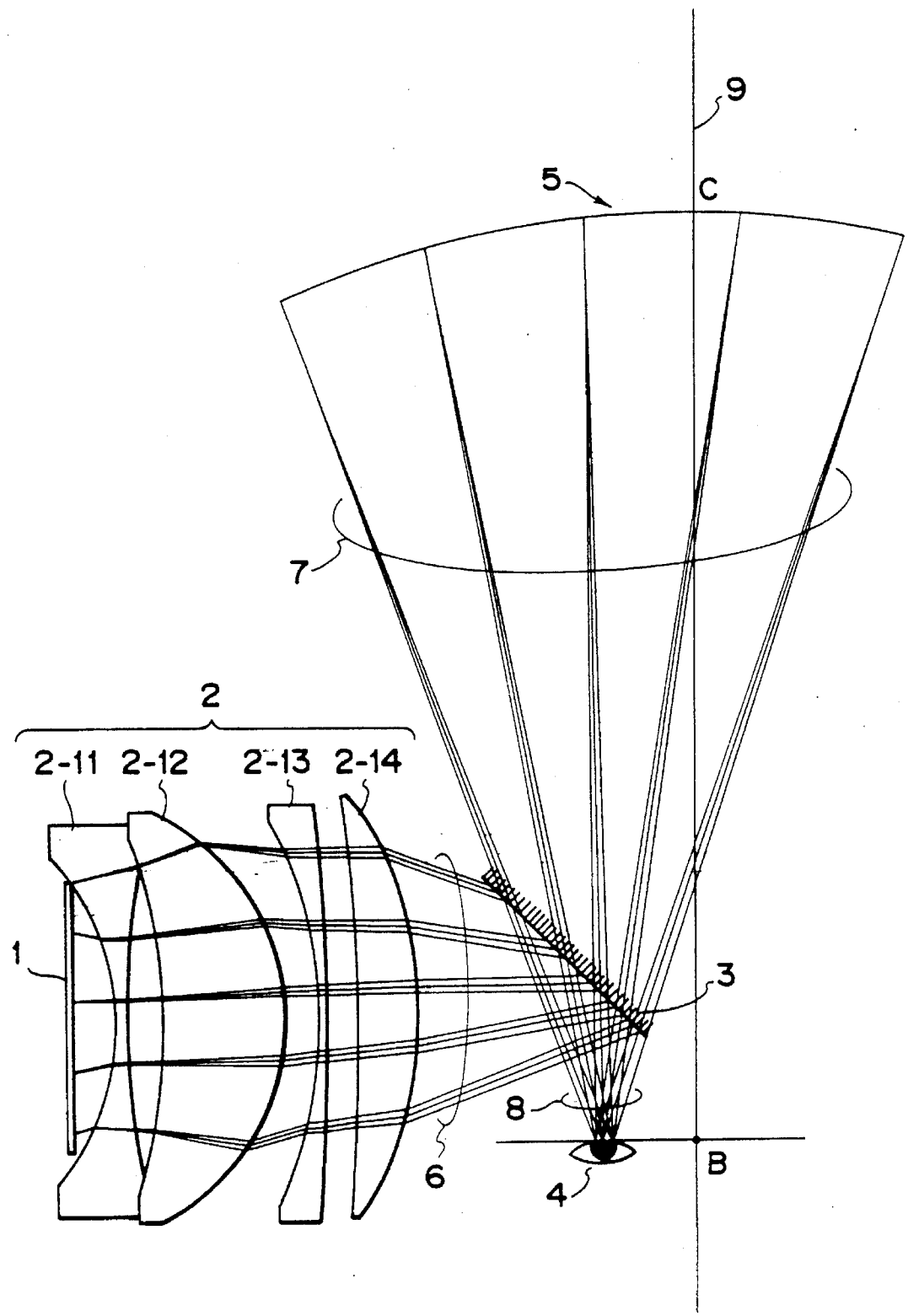
FIG. 3 shows the optical configuration of the second embodiment of the present invention.

FIG. 3 shows the second embodiment of the present invention, which is configured by using cylindrical surfaces for the virtual image surfaces, taking the above into account. In the drawing, the same component elements as those of the first embodiment are given the same numerals as those in FIG. 2. The explanation on the items, which provides the common actions to those of the first embodiment, will be omitted. The items, which characterize this embodiment, will be described.

FIG. 3 shows the optical system, corresponding to a left eye, of an apparatus, which is laterally symmetric. As in the case of FIG. 2, the drawing shows the view observed from above the head of an observer, numeral 9 indicating the symmetric plane of the observer's face. The symmetric plane 9 also serves as the symmetric plane, which shows the right side of the present apparatus, point B denoting the midpoint between the right eye and the left eye.

In this embodiment, a virtual image surface 5 for the left eye 4 does not have a curvature in the direction perpendicular to the paper surface; it forms a cylindrical surface as a whole, being a circle with a radius BC centering around the midpoint B in the paper surface.

In the case of this embodiment, BC is 300 mm. The section for the right eye, which is not illustrated, is symmetric to the symmetric plane 9. Since the point B is a point located on 9, the virtual image surface for the right eye does not have a curvature in the direction perpendicular to the paper surface of FIG. 2 and forms a cylindrical surface, being a circle with the radius of BC centering around B in the paper surface just same as in the case of the virtual image surface 5 for the left eye.

The lens system 2 works to turn the virtual image surface 5 for the left eye into a cylindrical surface. The lens system 2 in this embodiment comprises four lenses, 2–11 through 2–14. The first lens, 2–11, uses a lens, which is spherical on both surfaces. The second lens, 2–12, is a lens, wherein the left surface is a cylindrical surface, which does not have a curvature in the direction perpendicular to the paper surface but has a curvature in the direction in the paper surface, while the right surface is spherical.

The third lens, 2–13, uses a lens, wherein the left surface is spherical, while the right surface is a cylindrical surface, which does not have a curvature in the direction perpendicular to the paper surface but has a curvature in the direction in the paper surface. The fourth lens, 2–14, is a lens, which is spherical on both surfaces. The lens system 2 does not have astigmatism as a whole and it is set so that a point on the LCD 1 is imaged in the same state with respect to two directions, i.e., with respect to the cross section, which is perpendicular to the paper surface, and the cross section, which exists in the paper surface.

In order to form a cylindrical virtual image surface, glass materials and curvatures of the lens system 2 are set so that the Petzval's sum for the image formed on the cross section perpendicular to the paper surface is substantially zero, while the Petzval's sum for the image formed on the cross section in the paper surface is approximately $1/300$ mm$^{-1}$. Further, the second lens 2–12, the third lens 2–13, and the fourth lens 2–14 are arranged decentered by different amounts in the vertical direction in the paper surface of FIG. 3. As a result, the virtual image surface 5 is shaped into a circle on the cross section in the paper surface with point B as the center thereof.

In FIG. 3, exactly the same manner can be applied to turn the right section, which is not shown, into a cylindrical surface, which does not have a curvature in the direction in the paper surface but has the radius BC centering around point B in the paper surface. Therefore, the virtual image surface for the right eye and the virtual image surface 5 for the left eye exist in the same curved surface and they are overlapped with each other at least partially. Setting the virtual image surfaces as described above makes it possible to display images with greater presence to the observer due to the surrounding effect.

In this embodiment, the virtual image surfaces in the cross section in the paper surface are the circles centering around midpoint B between the right eye and the left eye. The center of the circles, however, may be a point other than B on the symmetric plane 9 of the observer's face, e.g., the center of the observer's head or the rotational center of the observer's neck. In such a case, the position of the image forming point of the lens system 2, including the cylindrical surfaces, and the Petzval's sums and the decentering amounts of the image forming system on the cross sections in the paper surface may be set to match the condition of each case.

In the second embodiment of the present invention, the virtual image surfaces having cylindrical surfaces are implemented by using a decentered lens system, including the cylindrical surfaces, and a half mirror. The third embodiment uses a hologram combiner to implement the cylindrical virtual image surfaces of the second embodiment.

Figure 4:
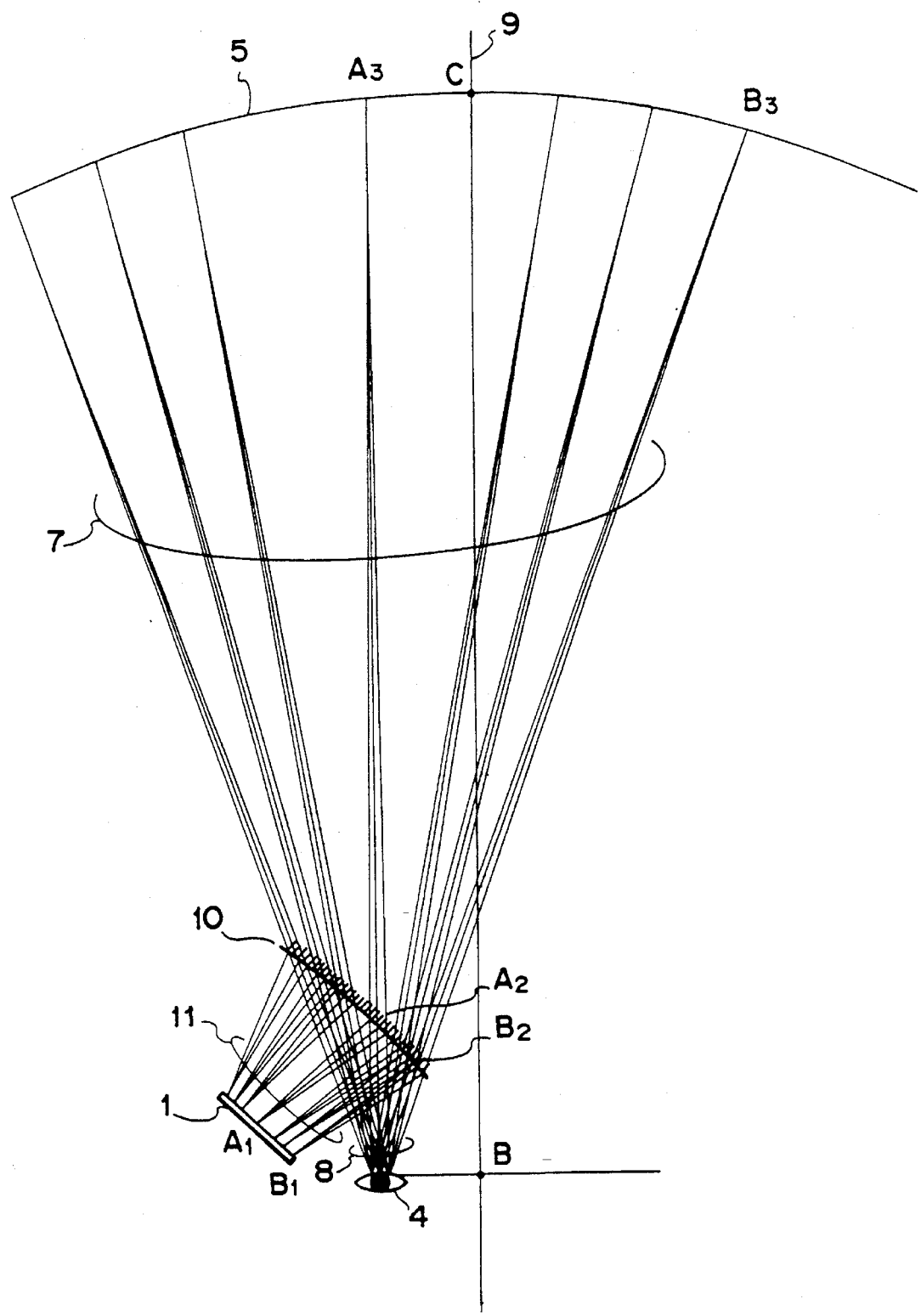
FIG. 4 shows the optical configuration of the third embodiment of the present invention.

FIG. 4 is an optical system representing the third embodiment, wherein virtual image surfaces formed and an image visually recognized by the observer are the same as those of the second embodiment. In the drawing, the same numerals as those of the previous embodiments are given the same numerals; therefore, the explanation on the common parts will be simplified or omitted.

In this embodiment also, an apparatus is laterally symmetric with respect to the symmetric plane of the face as in the first and second embodiments. Hence, the drawing shows only the part which corresponds to a left eye and the part for a right side is omitted. First, an LCD 1 is illuminated by an illuminating system, which is not shown, from the left bottom side in FIG. 4, producing a light beam 11 having the information on the image. The light beam 11 is reflected by a hologram combiner 10 and it becomes a reflected light beam 8 to be incident on the left eye 4. The lens of the hologram combiner 10 also works to make the observer recognize the reflected light beam 8 as if it were a light beam emitted from each of several points on the virtual image surface 5.

As a result, an image displayed on the LCD 1 is enlarged to be visually recognized by the observer. As in the case of the second embodiment, the virtual image surface 5 does not have a curvature in the direction perpendicular to the paper surface, but it is a cylindrical surface in the direction within the paper surface, the cylindrical surface being a circle which has the radius BC centering around midpoint B between the left eye and the right eye, which is not shown. The virtual image surface 5 in FIG. 4 is identical to the virtual image surface of the second embodiment; therefore, the surrounding effect makes it possible to display images with greater presence to the observer.

In this embodiment, the hologram combiner 10 uses the cylindrical surface for the virtual image surface 5. This means that the light beam emitted from point A1 on the LCD 1 is incident on point A2 of the hologram combiner 10 to form an image as a virtual image at point A3 on the virtual image surface 5 due to the diffraction operation at A2.

Likewise, a light beam outgoing from point B1, which is different from point A1 is incident on point B2 of the hologram combiner 10 to form an image as a virtual image at point B3 on the virtual image surface 5 due to the diffraction operation at B2. Hence, the hologram combiner 10 is required to have diffraction grating distributed in the positions, where the light beam from each of the several points on the LCD 1 is incident on the combiner 10, so that virtual images are formed at the corresponding points on the cylindrical virtual surface 5.

The hologram combiner 10 having such a function can be produced by carrying out interference-printing of two light beams' wavefronts having phase distributions, which have been set in accordance with the required diffraction operation distribution.

Figure 5:
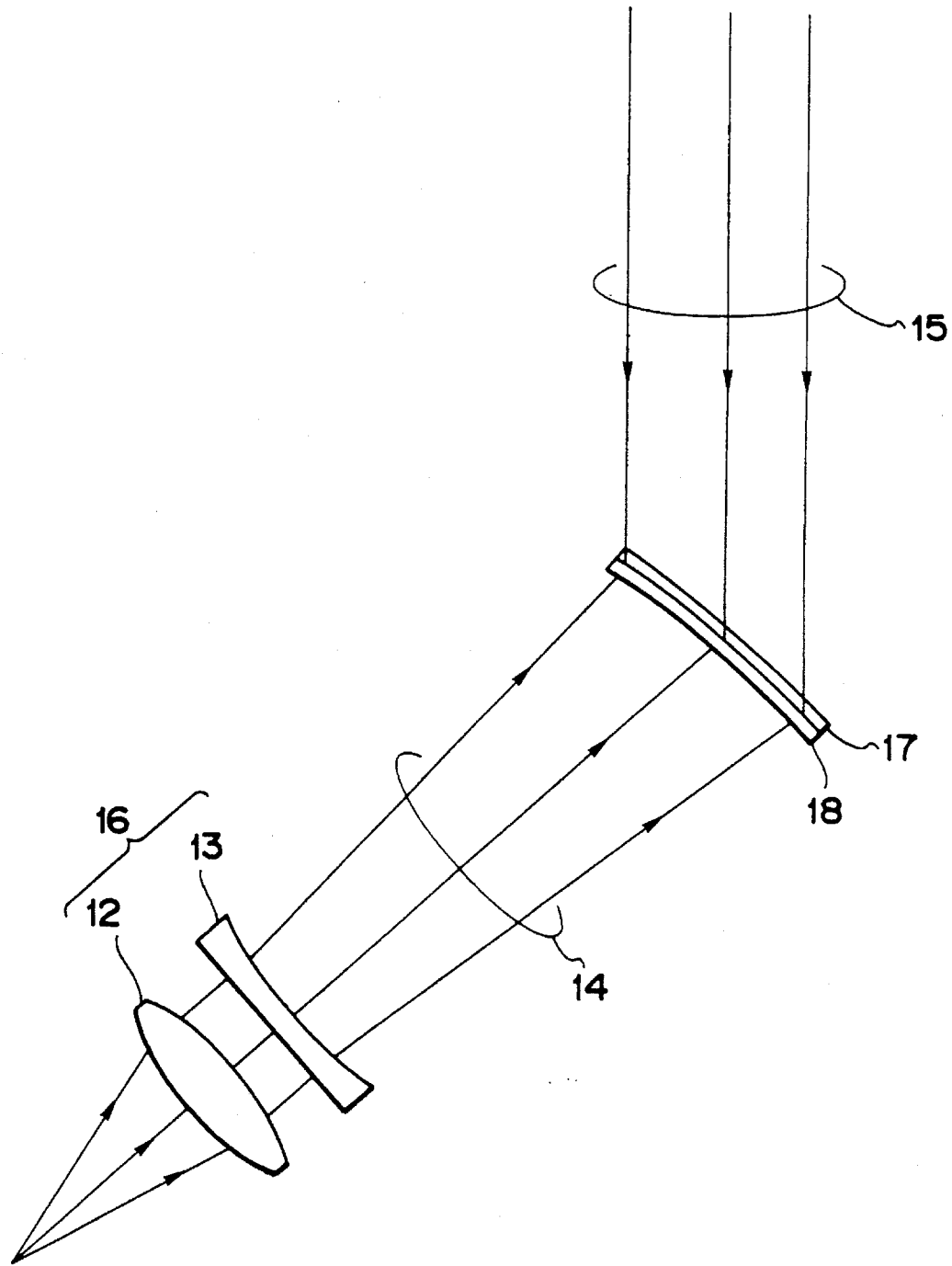
FIG. 5 is an illustrative drawing of a method for fabricating a hologram combiner which is used for the third embodiment.

FIG. 5 is an explanatory drawing which shows how to fabricate the hologram combiner 10 used for this embodiment. A hologram photosensitive material 18 is pasted or applied on a substrate 17 made of glass, plastics or the like, into which an object light beam 14 and a reference light beam 15 are incident thereon.

The object light beam 14 and the reference light beam 15 are produced by laser beams, which are not shown, and the interference fringes of the two are recorded on the photosensitive material 18. As the photosensitive material, photopolymer is extensively used. As a typical laser, there is an argon ion laser having a wavelength of 514.5 nm. It is of course needless to say that the other photosensitive materials may be used, including the publicly known gelatin dichromate, polyvinyl carbazole, and silver salt photosensitive materials.

In the system shown in FIG. 5, the reference light beam 15 is a parallel beam, while the object light beam 14 is a light beam, which is refracted by the printing lens system 16. The lens system 16 comprises two anamorphic lenses 12, 13. The lens 13 is a cylindrical lens, which does not have a curvature in the direction perpendicular to the paper surface but has a curvature only in the direction in the paper surface, while the lens 12 is the anamorphic lens comprising a curved surface, which is symmetric to the paper surface. The printing lens system 16 is set so that the hologram combiner 10 generates an object light beam 14, which provides the phase distribution for implementing a required diffraction operation.

Figure 6:
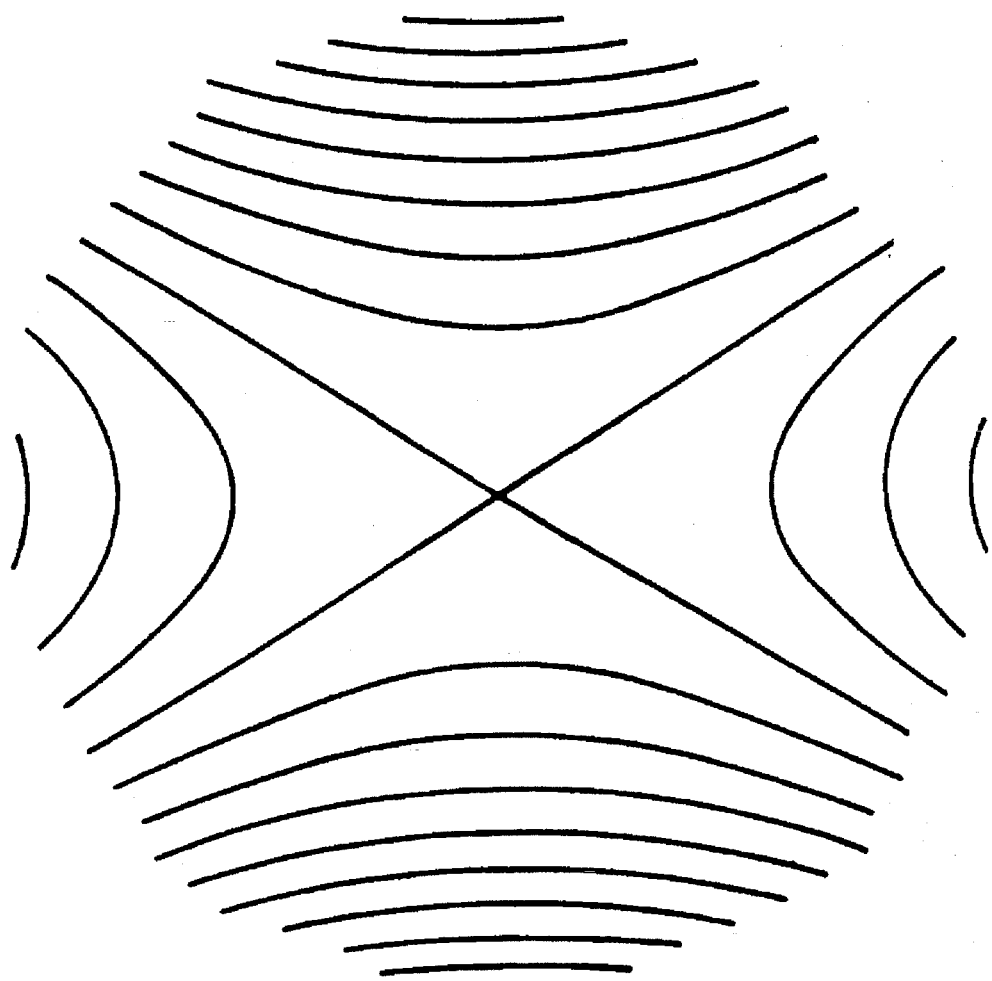
FIG. 6 shows a phase distribution of the printing wavefront of the hologram combiner.

The hologram combinet 10 is made by providing the photosensitive material 18, which has been exposed by the optical system configured in FIG. 5, with a predetermined development processing. The contour lines of FIG. 6 indicate the phase distribution of the non-spherical components of the object light beam 14 formed in FIG. 5, from which the components of the spherical wavefronts have been removed. It is seen that the wavefront distribution shaped like a horse saddle is formed, which is peculiar to the anamorphic system.

The foregoing cylindrical virtual image surfaces can be formed by using the hologram combiner fabricated in the manner described above. This embodiment permits easy implementation of modifications, including a virtual image surface, which consists of a cylindrical surface having the central point of the circle other than point B in the cross section in the paper surface, and a curved surface other than the cylindrical surface, e.g., a spherical or elliptic surface. In this case, the phase distribution of the printed wavefront producing the hologram combiner 10 may be reset to match the conditions of each case.

A hologram combiner produced in this embodiment is a Lippmann hologram printed by two opposed light beams shown in FIG. 5. Hence, increasing the thickness of the photosensitive material 18 results in high wavelength selectivity, which is characteristic of the three-dimensional grating, making it possible to extremely narrow the wavelength range of high diffraction efficiency owned by the hologram combiner 10 used in FIG. 4.

As a result, the chromatic aberration, which takes place in the combiner 10, can be controlled to a substantially negligible value. Further, if the chromatic aberration is an important factor, then an interference filter may be disposed between an illuminating system (not shown), which illuminates the LCD 1 and the LCD 1 in FIG. 4 in order to narrow the wavelength range of the illuminating light, thereby reducing the chromatic aberration, which occurs in the combiner 10.

Figure 7:
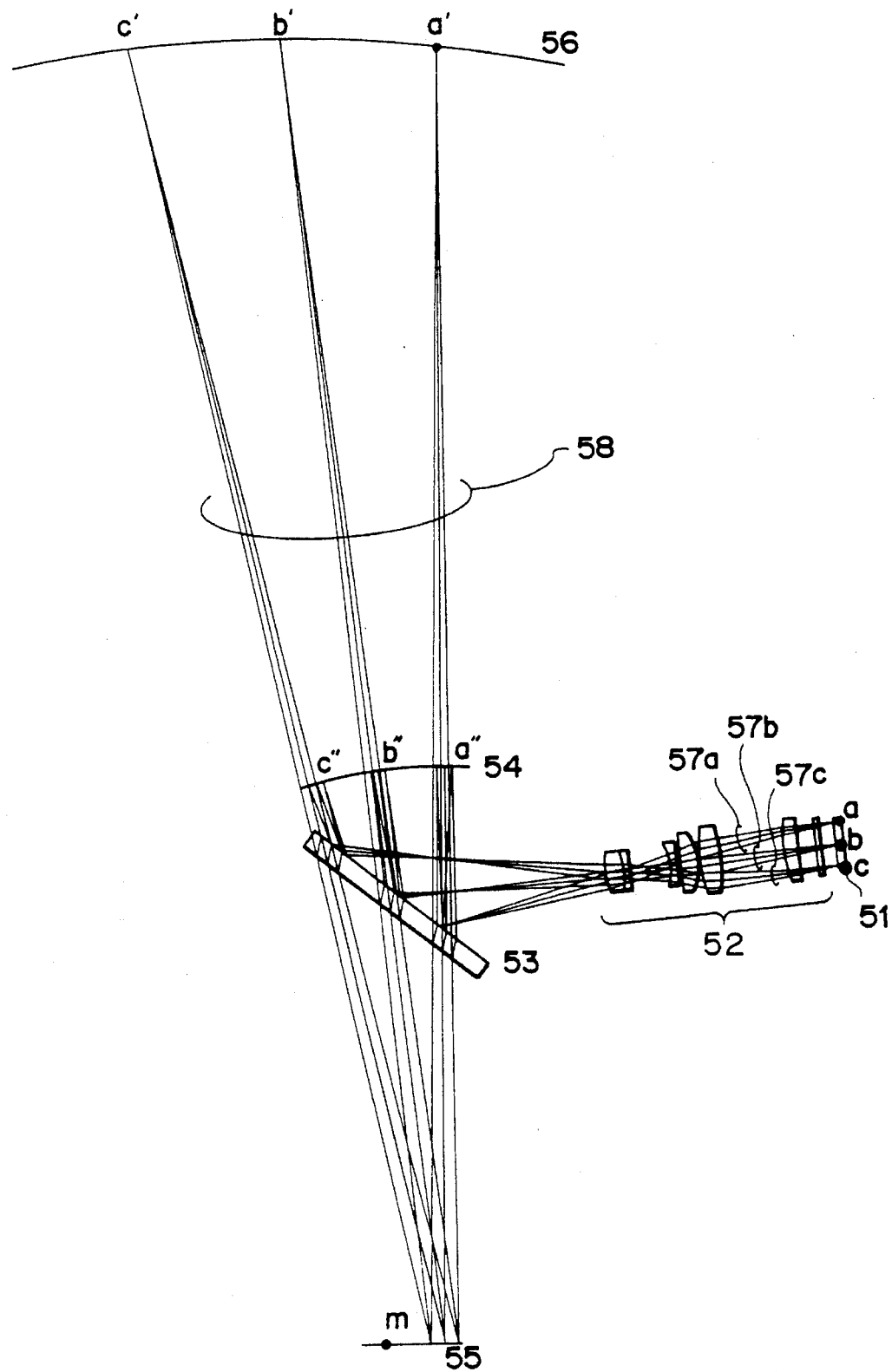
FIG. 7 shows an optical configuration of the fourth embodiment of the present invention.

FIG. 7 illustrates the fourth embodiment of the present invention. Numeral 51 denotes an image generator such as a CRT and LCD, numeral 52 denotes relay optical systems for converging light beams from an image screen of the image generator 51 to form an image at a midpoint, numeral 53 indicates a plane half mirror, which reflects the light beam from numeral 52, numeral 54 denotes a concave mirror, which is an ocular (eyepiece) optical system introducing the light beam from the plane half mirror 53 to an observer's pupil, and numeral 55 indicates an eye point where the observer's pupil is positioned.

Light beams (57a, 57b, 57c) coming from three points, a, b, c, on the image generator 51 respectively pass through each of the relay optical systems 52 and they are reflected by the plane half mirror 53 to then lead to the concave mirror 54, which reflect them. The reflected light beams are led to the plane half mirror 53 again, and they pass through the plane half mirror 53 this time, thus being incident on the eye point 55.

Numeral 56 denotes a virtual image surface of the image generator 51 formed by the relay optical system 52, the plane half mirror 53, and the concave mirror 54, a', b' and c' respectively corresponding to the points a, b and c on the image generator 51. In FIG. 7, a light beam 58, which extends upward from the concave mirror 54, is a virtual light beam; it is produced by extending a light beam, which is reflected by the concave mirror 54 to be directed to the eye point in the opposite direction from the light beam advancing direction.

This enables the observer to visually recognize the image on the image generator 51 as if it were enlarged to be located on the virtual image surface 56.

A method for forming the virtual image surface 56 into a curved surface will now be hereinafter described.

In this embodiment, the virtual image surface 56 is a cylindrical surface centering around an axis, which is perpendicular to the paper plane in FIG. 1, including a point m, which is shifted to the left from the center of the eye point 55 by about ½ of the distance between both eyes of the observer, e.g., 35 mm.

The light beams from each of the points (e.g., a, b, and c) on the image generator 51 are subjected to substantially identical image forming effect given by the coaxial relay optical system 52, which comprises rotationally symmetric lenses. The plane half mirror 53 does not directly contribute to relation of the formation of the image since it does not have optical power. In this embodiment, the concave mirror 54 is not shaped rotationally symmetric with respect to the optical axis of the relay optical system in order to form the virtual image surface 56, which is laterally dislocated and not rotationally symmetric with respect to the optical axis of the relay optical system.

The focal length of the relay lens 52 and the position of the concave mirror 54 are set so that the light beams of individual view angles are incident on the concave mirror 54 without overlapping. The concave mirror 54 is disposed in the vicinity of the intermediate image forming surface of the relay optical system 52 to prevent at least the principal ray of each of the view angles from overlapping on the concave mirror 54. The focal optical power and the reflecting directions around the points (a", b", and c" if the points are to respectively correspond to a, b, and c), where the main beams of the view angles intersect with the concave mirror 54, are set so as to form the virtual image surface 56. If there is a large overlap of the local areas corresponding to each of view angles of the concave mirror 54, then it is difficult to decide on the shape of the concave mirror 54 while satisfying the requirements for the virtual image position for each view angle.

Therefore, it is one of the efficient methods to provide a mirror, which is not rotationally symmetric, in the vicinity of the intermediate image forming surface of the relay optical system with small overlap of the light beams of the view angles in order to obtain virtual images, the shapes thereof not being rotationally symmetric to the optical axis of the relay optical system, by a mirror which is not rotationally symmetric to the optical axis of the relay optical system. Moreover, in this embodiment, the virtual image surface 56 is a cylindrical surface; therefore, it is vertically symmetric with respect to the paper surface in FIG. 7 as the symmetric surface, and the concave mirror 54 is also shaped so that it is symmetric to the same paper surface.

Figure 8:
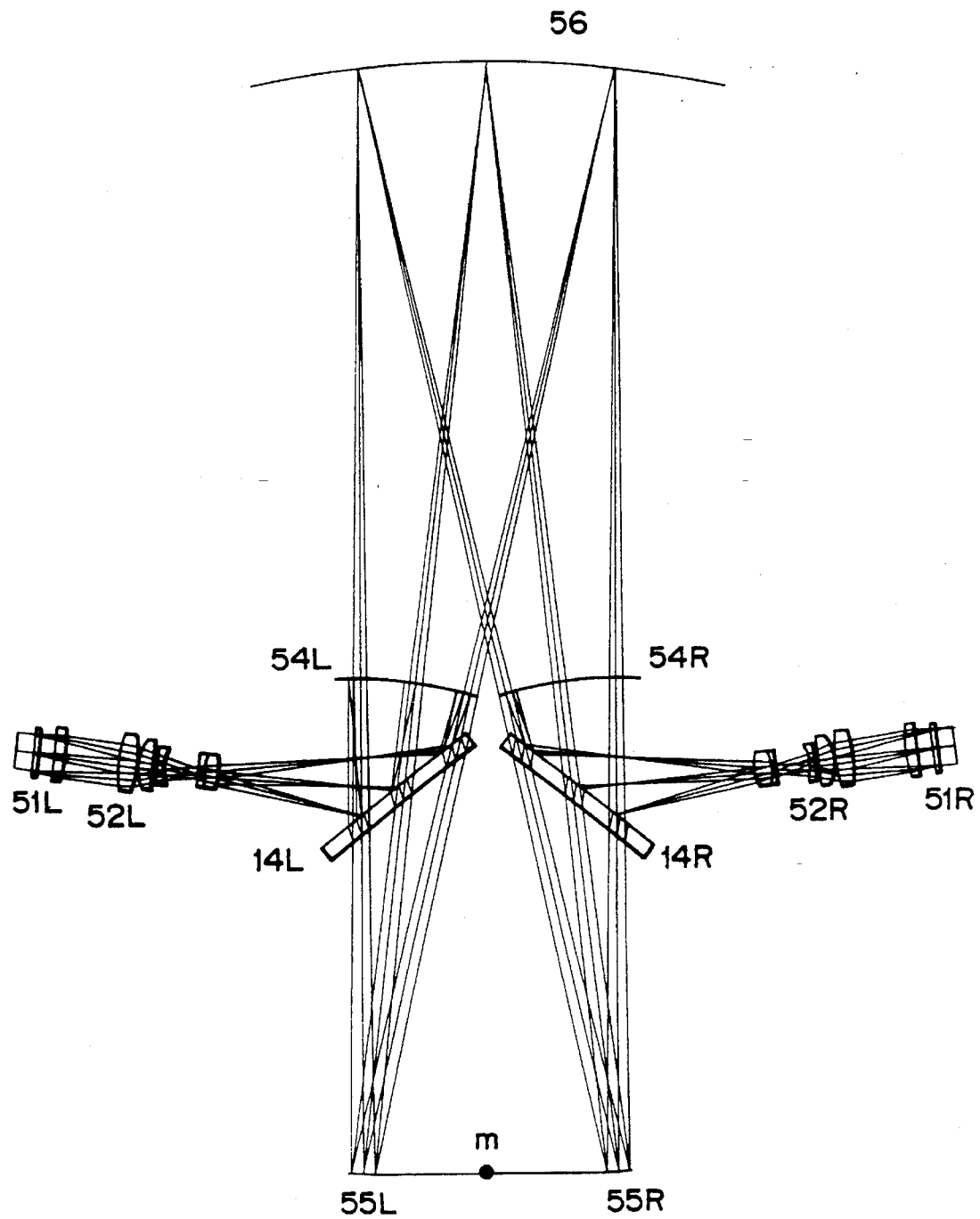
FIG. 8 shows a case, wherein an optical configuration of the fourth embodiment of the present invention is used for both eyes.

FIG. 8 shows a case wherein the image displaying apparatus explained in the fourth embodiment is used, each of the apparatuses used for a right eye and a left eye, to display an image simultaneously to the right and left eyes, and the virtual image surfaces formed by the right and left image displaying units are connected to make a continuous curved surface. This means that both virtual image surfaces are located in a curved surface in the same position. The same members as those of FIG. 7 are given the same numerals, with R for the right eye and L for the left eye. The right and left virtual image surfaces form a cylindrical surface surrounding the observer's head, centering around the axis, which passes through the approximate midpoint m between the observer's both eyes and which is perpendicular to the paper surface in FIG. 8. The surrounding effect of the virtual image enables an image with a greater presence to be displayed to the observer.

Figure 9:
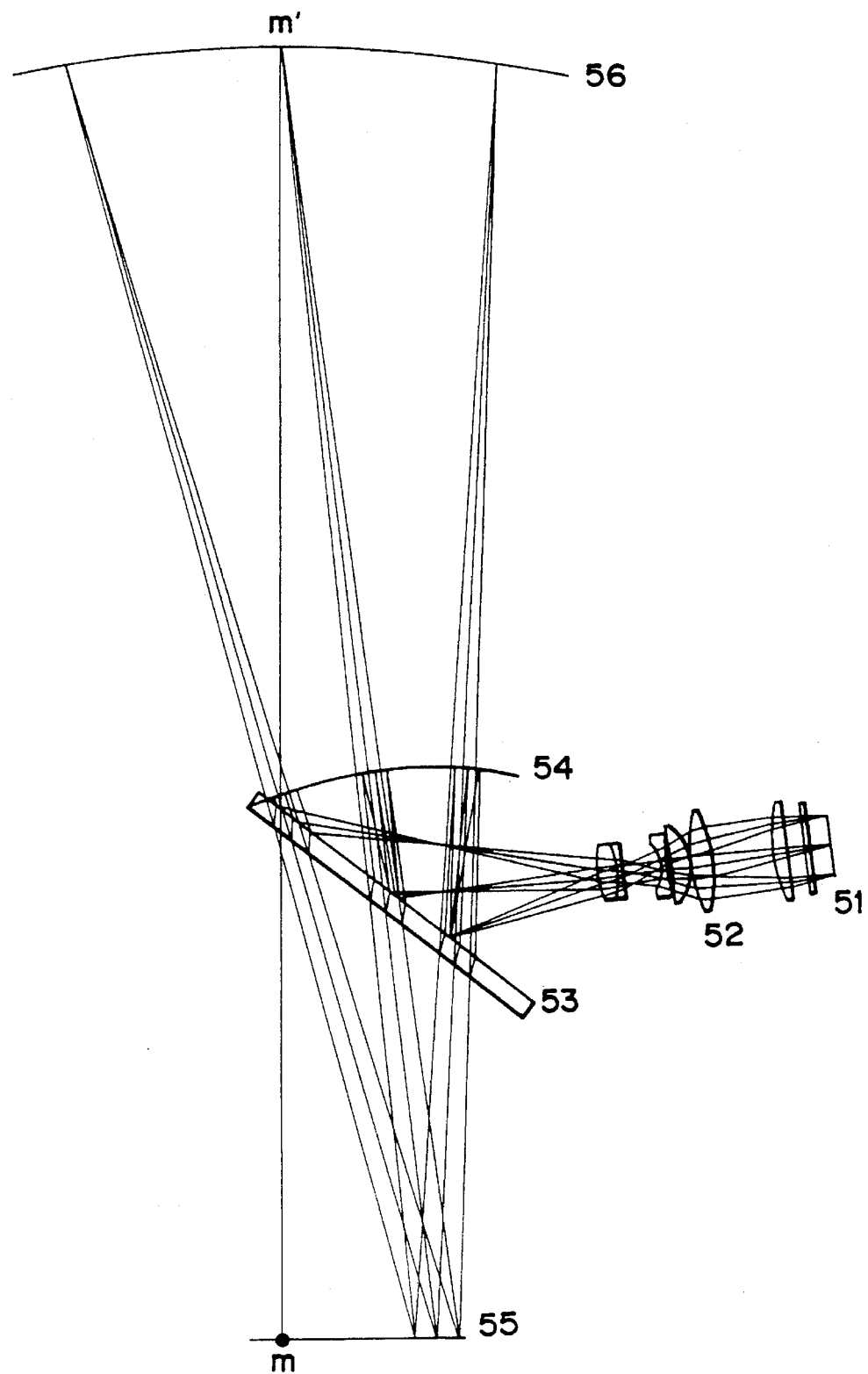
FIG. 9 shows an optical configuration of the fifth embodiment of the present invention.

In an optical system, which is substantially identical to the fourth embodiment, which has already been described, by changing the shape of the concave mirror, the virtual image surface 16 combining the two virtual image surfaces formed by the right and left image displaying units can be turned into a rotationally symmetric surface which uses, as the substantially rotationally symmetric axis, a vertical bisector of a line segment of 15L–15R connecting the both eyes of the observer and which is an axis in the paper surface. This is implemented by the fifth embodiment shown in the drawing of FIG. 9; the same members as those of FIG. 8 are given the same numerals and reference characters. The fifth embodiment differs from the fourth embodiment in that the virtual image surface 56 is a parabolic surface, and the rotational symmetric axis thereof is the vertical bisector of a line segment 55R - 55L connecting the observer's eyes and a straight line m—m', which is parallel to the direction of the light of sight when the observer gazes at the front point at infinity, and in that the shape of the concave mirror 14 is different because of those differences. Displaying images, which make the observer feel as if the images were moving toward the observer or the observer himself were moving toward the images, by using the virtual image surface having such a shape makes it possible to give greater presence to the observer.

Figure 10:
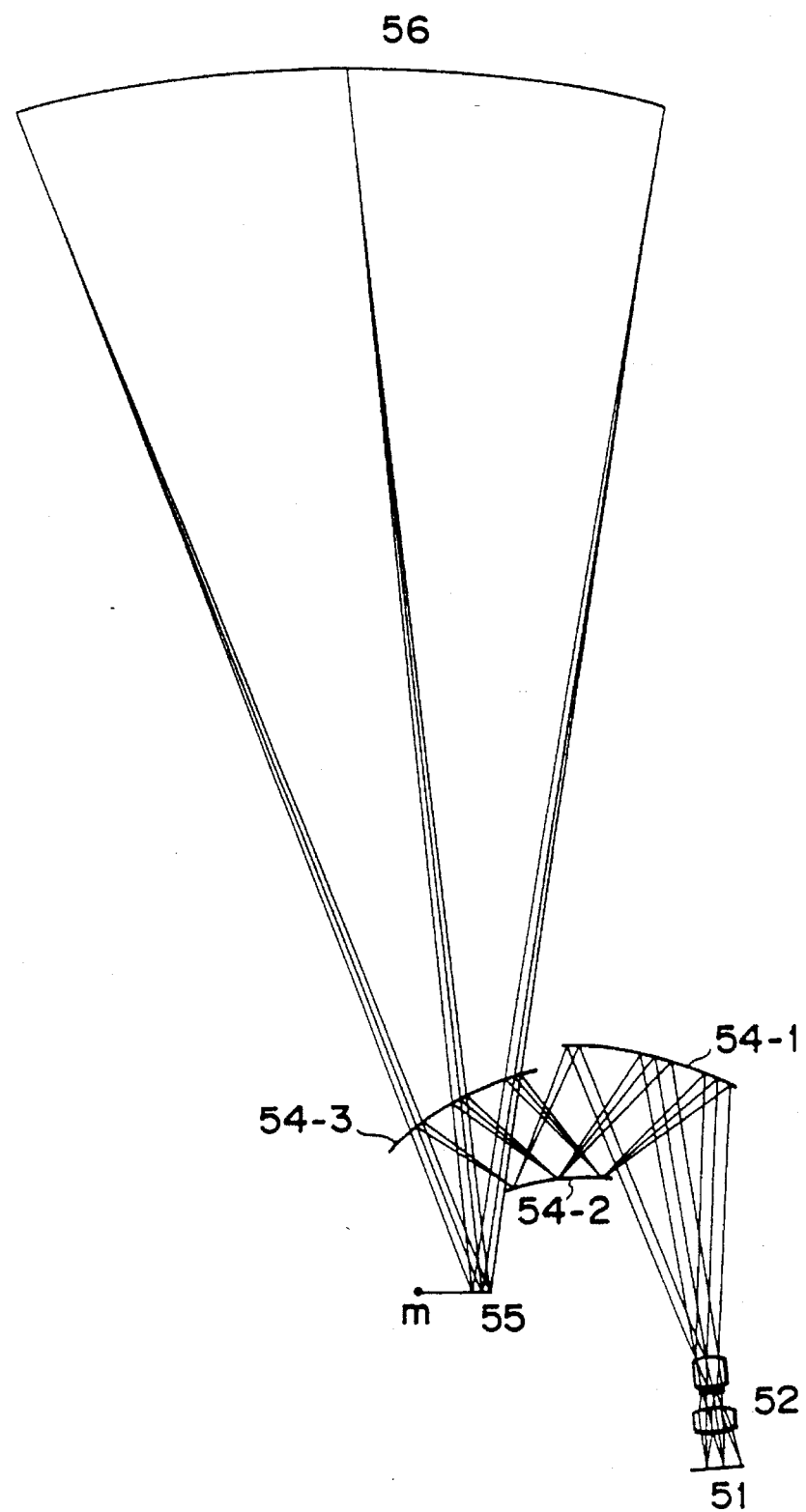
FIG. 10 shows an optical configuration of the sixth embodiment of the present invention.

FIG. 10 illustrates the sixth embodiment, in which a relay lens and three mirrors are used. The members common to those of FIG. 7 are given the same numerals and reference characters. The light beams from the image generator 51 pass through the coaxial system, relay lenses 52, to be incident on a first mirror 54-1 (concave) to be reflected thereby to be led to a second mirror 54-2 (convex), then they are formed into an intermediate images in the vicinity of the second mirror 54-2. The light beams are further reflected off the second mirror 54-2 to be led to a third mirror 54-3 (concave) to be further reflected thereby to be incident on an eye point 55, making the observer visually recognize them as an image on a virtual image surface 56. In this embodiment, as in the fourth embodiment of the present invention, the virtual image surface 56 is a cylindrical surface centering around an axis, which passes through the point m, which is shifted to the left from the center of the eye point 55 by about ½ of the distance between the observer's both eyes, e.g., by 35 mm, and which is perpendicular to the paper surface in FIG. 10.

In this embodiment, the first mirror 54-1, the second mirror 54-2, and the third mirror 54-3 have the shapes, which are not rotationally symmetric to the optical axis of the relay optical system, and the local optical power and reflection at the points, where the principal ray of each of the view angles intersect with the first, second, and third mirrors, are set so that the virtual image surface 56 is formed into a cylindrical surface centering around an axis, which passes through the point m, which is shifted to the left from the center of the eye point 55 by about ½ of the distance between the observer's both eyes, e.g., 35 mm and which is perpendicular to the paper surface in FIG. 10.

Moreover, in this embodiment, the whole optical system is configured so as to minimize the overlap of the incident light beams of the view angles at the first, second, and third mirrors, leaving the freedom of correcting the aberration in relation to the light beams of the respective view angles. To be more specific, the second mirror 54-2 has the intermediate image forming point nearby; therefore, the shape of the second mirror 54-2 makes less contribution to the aberration related to an image formation and an image forming performance, making it possible to adjust the directions of the principal ray of each of the view angles independently of the image formation and the image forming performance. This means that the second mirror 54-2 allows distortion to be corrected independently of the factors related to the image formation and the aberration other than distortion. Further in this embodiment, the first mirror 54-1 and the third mirror 54-3 make it possible to correct astigmatism and coma aberration, which are frequently caused by decentering and also to simultaneously form the virtual image surface 56, which is the curved surface having the shape as described above.

Figure 11:
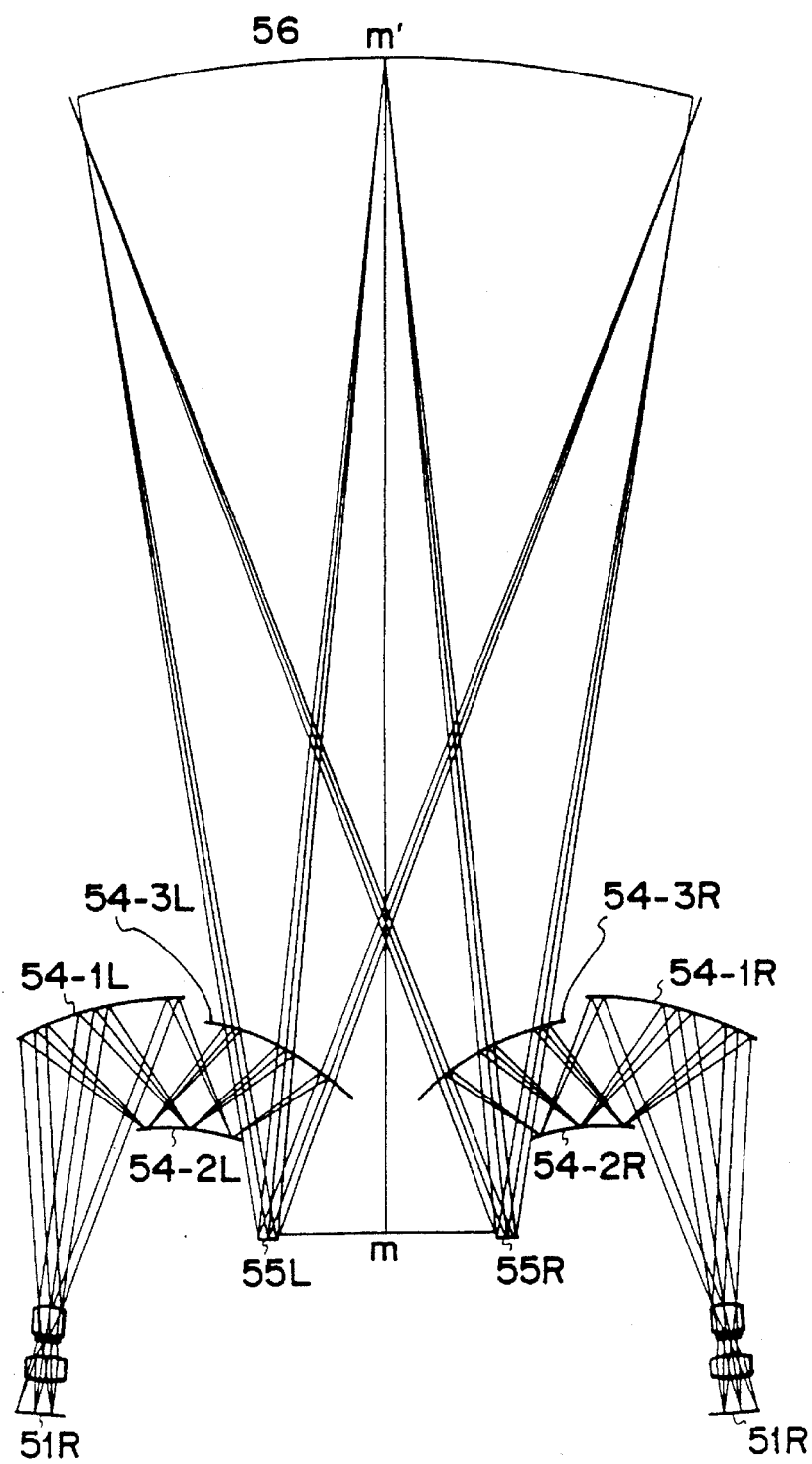
FIG. 11 shows a case, wherein an optical configuration of the sixth embodiment of the present invention is used for both eyes.

FIG. 11 shows a case, wherein the image displaying apparatus explained in the sixth embodiment is used, an apparatus for each of a right eye and a left eye, respectively, to display an image simultaneously the right and left eyes, the virtual image surfaces formed by the right and left image displaying apparatuses are set so as to be connected at the front of the observer.

The same members as those of FIG. 4 are given the same numerals, with R for the right eye and L for the left eye. The right and left virtual image surfaces form a cylindrical surface surrounding the observer's head, centering around the axis, which passes through the approximate midpoint m between the observer's both eyes and which is perpendicular to the paper surface. The surrounding effect of the virtual image enables an image with greater presence to be displayed to the observer.

The following shows the shapes and configuration data of the fourth through sixth embodiments of the present invention.

In the order of the light beams from the display surface to the observer's pupils, the coordinates of the position of the origin of the local coordinate system accompanying the i-th refraction surface and reflection surface in relation to the global coordinate system are represented by absolute coordinates (Yi, Zi) with the eye point where the observer's pupils are positioned, (the point where the principal rays of each of the view angles intersect with each other), established as the origin of the global coordinate system. In this absolute coordinate system, the optical axis of the observer's pupils is taken on axis Z, the axis which forms an angle of 90° with respect to axis Z in the paper surface in FIGS. 1, 3, and 4 is taken on axis Y, and the axis which is perpendicular to the paper surface is taken on axis X. Further, the tilt angle in the YZ surface of the i-th refraction surface and reflection surface is represented by an angle θi (unit: degrees), which sets the counterclockwise direction with respect to axis Z in the YZ surface as the positive direction. It is assumed that the origin of the local coordinate system accompanying to each of the optical elements exists on the YZ plane and there is no tilt of the optical elements in the XZ and XY surfaces. Reference character Ri denotes the curvature radius of the i-th optical element in the order of the light beams from the display surface to the end of the observer's pupils, Di denotes the lens thickness or air interval of the i-th lens, and Ni and vi are the refraction index and Abbe number of the i-th optical element. The sign of Ri is minus when the center of the curvature lies on the display surface side along the optical axis advancing from the display surface to the observer's pupils, while it is plus when it lies on the side of the observer's pupils.

The image displaying apparatus according to the present invention has at least one reflection surface, which is not rotationally symmetric to the optical axis of the relay optical system, the shape thereof being defined by the mathematic formula given below:

$$z = \frac{(x^2 + y^2)/R}{1 + \{1 - (1 + A)(x^2 + y^2)/R^2\}^{1/2}} + Bx^6 + Cx^4y^2 + Dx^4y + Ex^4 + Fx^2y^4 + Gx^2y^3 + Hx^2y^2 + Ix^2y + Jx^2 + Ky^6 + Ly^5 + My^4 + Ny^3 + Oy^2 + Py + Q$$

The coordinate (x, y, z) in the above formula for the curved surface is the local coordinate system with vertex coordinates (Yi, Zi) of each reflection surface as the origin, each axis being defined as follows:

z: Coordinate which defines the vertex of the reflection surface as the origin thereof and forms the tilt angle θi of the reflection surface in the counterclockwise direction in the YZ surface in relation to direction Z, which is the direction of the optical axis of the pupil.

y: Coordinate which defines the vertex of the reflection surface as the origin thereof and forms 90° in the counterclockwise direction in the YZ surface with respect to direction z.

x: Coordinate which defines the vertex of the reflection surface as the origin thereof and which is perpendicular to the YZ surface.

In the formula for the curved surface shown above, x has only terms of even-numbered degrees; therefore, if the absolute value of the x coordinate is equal to the y coordinate value, then the z coordinate value takes the same value regardless of the sign of the x coordinate value. Accordingly, the curved surface defined by the above formula for the curved surface has a surface-symmetric shape, which uses the YZ surface as the symmetric surface thereof.

The above formula for the curved surface expands a polynomial up to degree 6 of Zernike by, using x and y terms.

| | | Fourth Embodiment | | | | | |
|---|---|---|---|---|---|---|---|
| Surface No. i | (Yi, Zi) | θi | Ri | di | Ni | vi | |
| 0 | (92.229, −115.302) | 83.45° | ∞ | 5.00 | | | Display |
| 1 | (87.261, −114.731) | 83.45° | ∞ | 1.00 | 1.5163 | 64.15 | Cover glass |
| 2 | (86.268, −114.617) | 83.45° | ∞ | 4.40 | | | |
| 3 | (81.896, −114.115) | 83.45° | ∞ | 3.00 | 1.5163 | 64.15 | 1st lens |
| 4 | (78.916, −113.773) | 83.45° | −37.84 | 14.40 | | | |
| 5 | (64.610, −112.130) | 83.45° | 34.15 | 5.00 | 1.6967 | 55.52 | 2nd lens |
| 6 | (59.643, −111.560) | 83.45° | −36.49 | 0.25 | | | |
| 7 | (59.394, −111.532) | 83.45° | 13.19 | 4.20 | 1.8348 | 42.72 | 3rd lens |
| 8 | (55.222, −111.052) | 83.45° | 56.66 | 1.00 | | | |
| 9 | (54.228, −110.938) | 83.45° | −96.06 | 1.40 | 1.8466 | 23.78 | 4th lens |
| 10 | (52.837, −110.779) | 83.45° | 9.57 | 9.60 | | | |
| 11 | (43.300, −109.684) | 83.45° | 911.01 | 1.10 | 1.6989 | 30.12 | 5th lens |
| 12 | (42.207, −109.558) | 83.45° | 22.43 | 4.40 | 1.7995 | 42.24 | |
| 13 | (37.836, −109.056) | 83.45° | −20.51 | 47.20 | | | |
| 14 | (−9.057, −103.672) | 83.45° | ∞ | 0.00 | | | |
| 15 | (−9.057, −103.672) | 38.45° | ∞ | −30.00 | | | Plane half mirror (Reflection) |
| 16 | (−12.479, −133.476) | 6.55° | 89.62 | 30.00 | | | Concave mirror* |
| 17 | (−9.057, −103.672) | 6.55° | ∞ | 0.00 | | | |
| 18 | (−9.057, −103.672) | 38.45° | ∞ | 4.00 | 1.5167 | 64.16 | Plane half mirror (Transmission) |
| 19 | (−11.544, −100.539) | 38.45° | ∞ | 46.20 | | | |
| 20 | (−6.274, −54.641) | 6.55° | ∞ | 55.00 | | | |
| 21 | (0.000, 0.000) | 0.00° | ∞ | 0.00 | | | Eye point |

-continued

| | | | | | | | |
|---|---|---|---|---|---|---|---|
| 22 | (0.000, 0.000) | 0.00° | ∞ | −305.00 | | | |
| 23 | (1.338, −305.000) | 0.00° | ∞ | 0.00 | | | |
| 24 | (−33.662, −305.000) | 0.00° | ∞ | 0.00 | | | |
| 25 | (−33.662, −305.000) | 0.00° | 305.00 | 0.00 | | | Virtual image surface (Cylindrical) |

Data on the shape of the concave mirror $R = 89.6188671$
$A = -8.339e+00$
$B = -3.058e-10$
$C = -8.579e-10$
$D = -1.362e-09$
$E = 1.308e-06$
$F = -7.298e-10$
$G = -1.043e-10$
$H = 2.477e-06$
$I = -9.174e-07$
$J = -6.844e-04$
$K = -2.785e-10$
$L = -3.609e-09$
$M = 1.241e-06$
$N = 4.237e-06$
$O = -6.407e-04$
$P = -4.280e-03$
$Q = 3.309e-04$

Fifth Embodiment

| Surface No. i | $(Y_i, Z_i)$ | $\theta_i$ | $R_i$ | $d_i$ | $N_i$ | $\nu_i$ | |
|---|---|---|---|---|---|---|---|
| 0 | (92.229, −115.302) | 83.45° | ∞ | 5.00 | | | Display |
| 1 | (87.261, −114.731) | 83.45° | ∞ | 1.00 | 1.5163 | 64.15 | Cover glass |
| 2 | (86.268, −114.617) | 83.45° | ∞ | 4.40 | | | |
| 3 | (81.896, −114.115) | 83.45° | ∞ | 3.00 | 1.5163 | 64.15 | 1st lens |
| 4 | (78.916, −113.773) | 83.45° | −37.84 | 14.40 | | | |
| 5 | (64.610, −112.130) | 83.45° | 34.15 | 5.00 | 1.6967 | 55.52 | 2nd lens |
| 6 | (59.643, −111.560) | 83.45° | −36.49 | 0.25 | | | |
| 7 | (59.394, −111.532) | 83.45° | 13.19 | 4.20 | 1.8348 | 42.72 | 3rd lens |
| 8 | (55.222, −111.052) | 83.45° | 56.66 | 1.00 | | | |
| 9 | (54.228, −110.938) | 83.45° | −96.06 | 1.40 | 1.8466 | 23.78 | 4th lens |
| 10 | (52.837, −110.779) | 83.45° | 9.57 | 9.60 | | | |
| 11 | (43.300, −109.684) | 83.45° | 911.01 | 1.10 | 1.6989 | 30.12 | 5th lens |
| 12 | (42.207, −109.558) | 83.45° | 22.43 | 4.40 | 1.7995 | 42.24 | |
| 13 | (37.836, −109.056) | 83.45° | −20.51 | 47.20 | | | |
| 14 | (−9.057, −103.672) | 83.45° | ∞ | 0.00 | | | |
| 15 | (−9.057, −103.672) | 38.45° | ∞ | −30.00 | | | Plane half mirror (Reflection) |
| 16 | (−12.479, −133.476) | 6.55° | 95.56 | 30.00 | | | Concave mirror* |
| 17 | (−9.057, −103.672) | 6.55° | ∞ | 0.00 | | | |
| 18 | (−9.057, −103.672) | 38.45° | ∞ | 4.00 | 1.5167 | 64.16 | Plane half mirror |
| 19 | (−11.544, −100.539) | 38.45° | ∞ | 46.20 | | | (Transmission) |
| 20 | (−6.274, −54.641) | 6.55° | ∞ | 55.00 | | | |
| 21 | (0.000, 0.000) | 0.00° | ∞ | 0.00 | | | Eye point |
| 22 | (0.000, 0.000) | 0.00° | ∞ | −305.00 | | | |
| 23 | (1.338, −305.000) | 0.00° | ∞ | 0.00 | | | |
| 24 | (−33.662, −305.000) | 0.00° | ∞ | 0.00 | | | |
| 25 | (−33.662, −305.000) | 0.00° | 305.00 | 0.00 | | | Virtual image surface (Parabolic surface) |

Data on the shape of the concave mirror $R = 95.5592766$
$A = -1.015e+01$
$B = -3.142e-10$
$C = -8.984e-10$
$D = -1.503e-09$
$E = 1.305e-06$
$F = -7.875e-10$
$G = -2.140e-10$
$H = 2.508e-06$
$I = -1.131e-06$
$J = -3.455e-04$
$K = -2.254e-10$
$L = -3.004e-09$
$M = 1.178e-06$
$N = 3.271e-06$
$O = -3.048e-04$ P = −4.308e−03
Q = 1.622e−04

Sixth Embodiment

| Surface No. i | (Yi, Zi) | θi | Ri | di | Ni | νi | |
|---|---|---|---|---|---|---|---|
| 0 | (−66.470, −51.547) | 4.37° | ∞ | 10.79 | | | Display |
| 1 | (−65.647, −40.784) | 4.37° | 21.83 | 6.68 | 1.6019 | 61.26 | 1st lens |
| 2 | (−65.138, −34.127) | 4.37° | −22.22 | 5.44 | | | |
| 3 | (−64.722, −28.698) | 4.37° | −9.21 | 0.39 | 1.6860 | 31.21 | 2nd lens |
| 4 | (−64.692, −28.304) | 4.37° | 10.34 | 0.17 | | | |
| 5 | (−64.680, −28.137) | 4.37° | 12.58 | 8.96 | 1.7374 | 45.10 | 3rd lens |
| 6 | (−63.996, −19.199) | 4.37° | −11.80 | 0.00 | | | |
| 7 | (−63.996, −19.199) | 4.37° | ∞ | 0.00 | | | |
| 8 | (−61.170, −19.496) | 6.00° | ∞ | 92.47 | | | |
| 9 | (−28.000, 69.994) | 6.00° | −73.33 | −38.00 | | | 1st mirror |
| 10 | (−28.000, 31.994) | 0.00° | ∞ | 0.00 | | | |
| 11 | (−28.000, 31.994) | 14.29° | −56.15 | 32.00 | | | 2nd mirror |
| 12 | (−28.000, 63.994) | 0.00° | −68.51 | −35.00 | | | 3rd mirror |
| 13 | (−28.000, 28.994) | 0.00° | ∞ | −28.99 | | | |
| 14 | (0.000, 0.000) | 0.00° | ∞ | 0.00 | | | Eye point |
| 15 | (0.000, 0.000) | 0.00° | ∞ | 350.00 | | | |
| 16 | (35.000, 350.000) | 0.00° | −350.00 | 0.00 | Virtual image surface (Cylindrical) | | |

Data on the shape of the 1st mirror

R = −73.3312120
A = −4.744e−01
B = −2.626e−11
C = −1.909e−11
D = −8.198e−10
E = −8.579e−08
F = −1.126e−10
G = −1.180e−09
H = −1.308e−07
I = 2.058e−06
J = 5.914e−04
K = −2.308e−11
L = 3.725e−10
M = 5.376e−09
N = 1.058e−06
O = 1.219e−03
P = 1.277e−01
Q = −4.527e−04

Data on the shape of the 2nd mirror

R = −56.1455696
A = 2.051e−01
B = 1.428e−08
C = 1.665e−08
D = −1.663e−07
E = −3.887e−06
F = −4.904e−09
G = 1.463e−07
H = −5.583e−06
I = −2.311e−04
J = −4.546e−03
K = 8.025e−09
L = 2.385e−08
M = −4.107e−06
N = −7.463e−05
O = 1.574e−03
P = −2.741e−01
Q = 7.445e−04

Data on the shape of the 3rd mirror

R = −68.5114212
A = −3.992e−01
B = −4.189e−11
C = 6.169e−11
D = −6.592e−09
E = −2.157e−07
F = −1.681e−10
G = 3.024e−09
H = −4.706e−07
I = −5.642e−06
J = −7.795e−05

-continued

K = −3.967e−11
L = −6.923e−10
M = −1.009e−07
N = 6.121e−06
O = 7.215e−04
P = −3.914e−02
Q = −1.608e−04

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image displaying apparatus comprising:

a display unit, which irradiates a beam, and an optical system, for directing a light beam from said display unit to an observer's pupil, wherein a virtual image surface formed by said optical system includes a curved surface; wherein a curvature radius of said virtual image surface is substantially equal to a reciprocal number of a Petzval's sum of said optical system in a cross section having said curvature.

2. The image displaying apparatus according to claim 1, wherein one each of said image displaying apparatus is respectively provided so as to correspond to a right pupil and a left pupil of said observer, whereby each of virtual image surfaces thereof is formed in the same curved surface.

3. The image displaying apparatus according to claim 2, wherein said virtual image surfaces are at least partially overlapped.

4. The image displaying apparatus according to claim 1, wherein said curved surface includes a spherical surface.

5. The image displaying apparatus according to claim 1, wherein said curved surface includes a cylindrical surface.

6. The image displaying apparatus according to claim 1, wherein said curved surface includes a parabolic surface.

7. The image displaying apparatus according to claim 1, wherein said optical system includes a hologram combiner.

8. An image displaying apparatus comprising:

a display unit, which irradiates a beam, and an optical system, for directing a light beam from said display unit to an observer's pupil, wherein a virtual image surface formed by said optical system includes a curved surface;

wherein said optical system has a relay optical system and a reflection surface having a shape which is not rotationally symmetric to an optical axis of said relay optical system and having an optical power along a light beam which travels from said display unit toward said pupil.

9. The image displaying apparatus according to claim 8, wherein said reflection surface is positioned in the vicinity of an intermediate image forming surface of said relay optical system.

10. The image displaying apparatus according to claim 8, wherein one each of said image displaying apparatus is respectively provided so as to correspond to a right pupil and a left pupil of said observer, whereby each of virtual image surfaces thereof is formed in the same curved surface.

11. The image displaying apparatus according to claim 10, wherein said virtual image surfaces are at least partially overlapped.

12. The image displaying apparatus according to claim 8, wherein said curved surface includes a spherical surface.

13. The image displaying apparatus according to claim 8, wherein said curved surface includes a cylindrical surface.

14. The image displaying apparatus according to claim 8, wherein said curved surface includes a parabolic surface.

15. The image displaying apparatus according to claim 8, wherein said optical system includes a hologram combiner.

* * * * *

UNITED STATES PATENT AND TRADEMARK OFFICE
CERTIFICATE OF CORRECTION

PATENT NO.    : 5,515,122
DATED         : May 7, 1996
INVENTOR(S)   : Hideki Morishima, et al.

It is certified that error appears in the above-identified patent and that said Letters Patent is hereby corrected as shown below:

Column 7, line 45; change "combinet" to read -- combiner --.

Signed and Sealed this

Twenty-seventh Day of August, 1996

Attest:

BRUCE LEHMAN

*Attesting Officer*    Commissioner of Patents and Trademarks